United States Patent
Hayward et al.

(10) Patent No.: US 11,178,174 B2
(45) Date of Patent: Nov. 16, 2021

(54) DETECTING MAN IN THE MIDDLE ATTACKS ON A LOCAL AREA NETWORK

(71) Applicant: CipherTooth, Inc, American Fork, UT (US)

(72) Inventors: Jerry G. Hayward, American Fork, UT (US); F. Edward Hayward, II, American Fork, UT (US)

(73) Assignee: CipherTooth, Inc, American Fork, UT (US)

( * ) Notice: Subject to any disclaimer, the term of this patent is extended or adjusted under 35 U.S.C. 154(b) by 0 days.

(21) Appl. No.: 16/053,730

(22) Filed: Aug. 2, 2018

(65) Prior Publication Data

US 2019/0044974 A1 Feb. 7, 2019

Related U.S. Application Data

(60) Provisional application No. 62/540,286, filed on Aug. 2, 2017.

(51) Int. Cl.
*H04L 29/06* (2006.01)
*H04L 12/28* (2006.01)
*H04L 12/733* (2013.01)
*H04L 29/12* (2006.01)
(Continued)

(52) U.S. Cl.
CPC .......... *H04L 63/1466* (2013.01); *H04L 12/28* (2013.01); *H04L 45/20* (2013.01); *H04L 63/1416* (2013.01); *H04L 61/103* (2013.01); *H04L 61/2015* (2013.01); *H04L 61/6009* (2013.01); *H04L 61/6022* (2013.01);
(Continued)

(58) Field of Classification Search
CPC . H04L 63/1466; H04L 63/1416; H04L 45/20; H04L 12/28; H04L 61/6009; H04L 61/103; H04L 63/0236; H04L 61/6022; H04L 61/2015; H04W 12/122
See application file for complete search history.

(56) References Cited

U.S. PATENT DOCUMENTS

| | | | |
|---|---|---|---|
| 7,222,255 B1 * | 5/2007 | Claessens | H04L 12/2856 714/4.12 |
| 9,680,860 B1 * | 6/2017 | Wallace | H04L 63/1433 |
| 9,888,035 B2 * | 2/2018 | Venkataramani | H04L 63/1466 |

(Continued)

OTHER PUBLICATIONS

PCT/US18/45069, "Notification of Transmittal of the International Search Report and the Written Opinion of the International Searching Authority, or the Declaration", International Searching Authority, dated Oct. 10, 2018, pp. 1-9.

*Primary Examiner* — Farid Homayounmehr
*Assistant Examiner* — Suman Debnath
(74) *Attorney, Agent, or Firm* — Kunzler Bean & Adamson (57) ABSTRACT

Apparatuses, methods, systems, and program products are disclosed for detecting man-in-the-middle attacks on a local area network. A method includes checking a first set of network settings information associated with a network router. A method includes requesting a second set of network settings information corresponding to the first set of network settings information. A method includes detecting a man-in-the-middle attacker on the network in response to at least a portion of the second set of network settings information not matching the first set of network settings information. A method includes triggering a countermeasure action related to the man-in-the-middle attacker.

18 Claims, 4 Drawing Sheets

(51) Int. Cl.
*H04W 12/088* (2021.01)
*H04W 12/122* (2021.01)

(52) U.S. Cl.
CPC ....... *H04L 63/0236* (2013.01); *H04W 12/088* (2021.01); *H04W 12/122* (2021.01)

(56) References Cited

U.S. PATENT DOCUMENTS

| | | | |
|---|---|---|---|
| 10,250,636 B2* | 4/2019 | Vissamsetty | H04L 63/1416 |
| 2002/0129355 A1* | 9/2002 | Velten | G06F 11/3013 |
| | | | 717/176 |
| 2010/0107250 A1 | 4/2010 | Li | |
| 2010/0242084 A1* | 9/2010 | Keeni | H04L 63/20 |
| | | | 726/1 |
| 2011/0099370 A1* | 4/2011 | Shen | H04L 29/12915 |
| | | | 713/162 |
| 2011/0271245 A1* | 11/2011 | Amundson | G06F 17/5031 |
| | | | 716/108 |
| 2011/0271345 A1 | 11/2011 | Wolman et al. | |
| 2015/0264081 A1* | 9/2015 | Lee | H04L 63/1466 |
| | | | 726/22 |
| 2017/0070412 A1* | 3/2017 | Kanevsky | H04L 43/0811 |
| 2018/0176248 A1* | 6/2018 | Nikravesh | H04L 63/1466 |
| 2018/0205749 A1* | 7/2018 | Premnath | H04L 63/1416 |

* cited by examiner

DETECTING MAN IN THE MIDDLE ATTACKS ON A LOCAL AREA NETWORK

CROSS-REFERENCES TO RELATED APPLICATIONS

This application claims the benefit of U.S. Provisional Patent Application No. 62/540,286 entitled "DETECTING MAN IN THE MIDDLE ATTACKS ON A LOCAL AREA NETWORK" and filed on Aug. 2, 2017 for Jerry Hayward, which is incorporated herein by reference.

FIELD

This invention relates to network security and more particularly relates to detecting man-in-the-middle attacks on a network.

BACKGROUND

Transmitting electronic data between computing devices occurs daily. In some scenarios, data transmissions between devices on a network may be intercepted by unauthorized devices that have access to the network traffic. Although the data being transmitted may be encrypted or otherwise secured, there are various ways in which an unauthorized device may intercept data transmitted between a sender and a receiver.

SUMMARY

Apparatuses, methods, systems, and program products are disclosed for detecting man in the middle attacks on a local area network. An apparatus, in one embodiment, includes a processor and a memory that stores code executable by the processor. In one embodiment, the executable code is executable by the processor to check a first set of network settings information associated with a network router. The network router may be configured to transmit data packets between devices within a network.

In some embodiments, the executable code is executable by the processor to request a second set of network settings information. The second set of network settings information may correspond to the first set of network settings information. In certain embodiments, the executable code is executable by the processor to detect a man-in-the-middle attacker on the network in response to at least a portion of the second set of network settings information not matching the first set of network settings information. In further embodiments, the executable code is executable by the processor to trigger a countermeasure action related to the man-in-the-middle attacker.

In one embodiment, the request for the second set of network settings information comprises a spoof request sent to the network router to connect to the network. In certain embodiments, the spoof request comprises a spoof dynamic configuration host protocol ("DHCP") request sent from a dummy media access control ("MAC") address.

In further embodiments, the request for the second set of network settings information comprises sending a traceroute command to the network router. The second set of network settings information may include a number of hops to the network router. The man-in-the-middle attacker may be detected in response to the number of hops to the network router being different than a previously determined number of hops to the network router.

In certain embodiments, the request for the second set of network settings information comprises sending a first dummy data packet to a media access control ("MAC") address for a device connected to the network, sending a second dummy data packet to an internet protocol ("IP") address for the device, the IP address associated with the MAC address, and receiving one or more of confirmation that the first and second dummy data packets were received at the device and confirmation that the MAC addresses of the first and second dummy data packets do not match.

In one embodiment, the request for the second set of network settings information is sent at periodic intervals. In further embodiments, the first and second sets of network settings information for the network router comprises one or more of a media access control ("MAC") address and an internet protocol ("IP") address. In certain embodiments, the code is further executable by the processor to determine the first set of network settings when the network router is first connected to the network.

In one embodiment, the countermeasure action comprises one or more of logging information associated with the man-in-the-middle attacker and sending a notification to an administrator that indicates the presence of the man-in-the-middle attacker. In some embodiments, the logged information is backed-up to a cloud-based data store that is accessible using a web service.

In one embodiment, the countermeasure action comprises broadcasting the logged information to other devices on the network and updating a blacklist of man-in-the-middle devices based on the broadcasted logged information. In various embodiments, the countermeasure action comprises poisoning the address resolution protocol ("ARP") cache of the man-in-the-middle attacker. In certain embodiments, the countermeasure action comprises remotely shutting-down the device of the man-in-the-middle attacker.

A method, in one embodiment, includes checking a first set of network settings information associated with a network router. The network router may be configured to transmit data packets between devices within a network. In further embodiments, the method includes requesting a second set of network settings information. The second set of network settings information may correspond to the first set of network settings information.

In various embodiments, the method includes detecting a man-in-the-middle attacker on the network in response to at least a portion of the second set of network settings information not matching the first set of network settings information. In some embodiments, the method includes triggering a countermeasure action related to the man-in-the-middle attacker.

In one embodiment, the request for the second set of network settings information comprises a spoof request sent to the network router to connect to the network. The spoof request may include a spoof dynamic configuration host protocol ("DHCP") request sent from a dummy media access control ("MAC") address.

In various embodiments, the request for the second set of network settings information comprises sending a traceroute command to the network router. The second set of network settings information may include a number of hops to the network router. The man-in-the-middle attacker may be detected in response to the number of hops to the network router being different than a previously determined number of hops to the network router.

In some embodiments, the countermeasure action comprises one or more of logging information associated with the man-in-the-middle attacker and sending a notification to an administrator that indicates the presence of the man-in-the-middle attacker. In various embodiments, the countermeasure action comprises broadcasting the logged information to other devices on the network and updating a blacklist of man-in-the-middle devices based on the broadcasted logged information. In further embodiments, the countermeasure action comprises poisoning the address resolution protocol ("ARP") cache of the man-in-the-middle attacker.

A computer program product, in one embodiment, comprises a computer readable storage medium storing computer usable program code executable to perform operations. In one embodiment, the operations include checking a first set of network settings information associated with a network router. The network router may be configured to transmit data packets between devices within a network. In further embodiments, the operations include requesting a second set of network settings information. The second set of network settings information may correspond to the first set of network settings information.

In various embodiments, the operations include detecting a man-in-the-middle attacker on the network in response to at least a portion of the second set of network settings information not matching the first set of network settings information. In some embodiments, the operations include triggering a countermeasure action related to the man-in-the-middle attacker.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
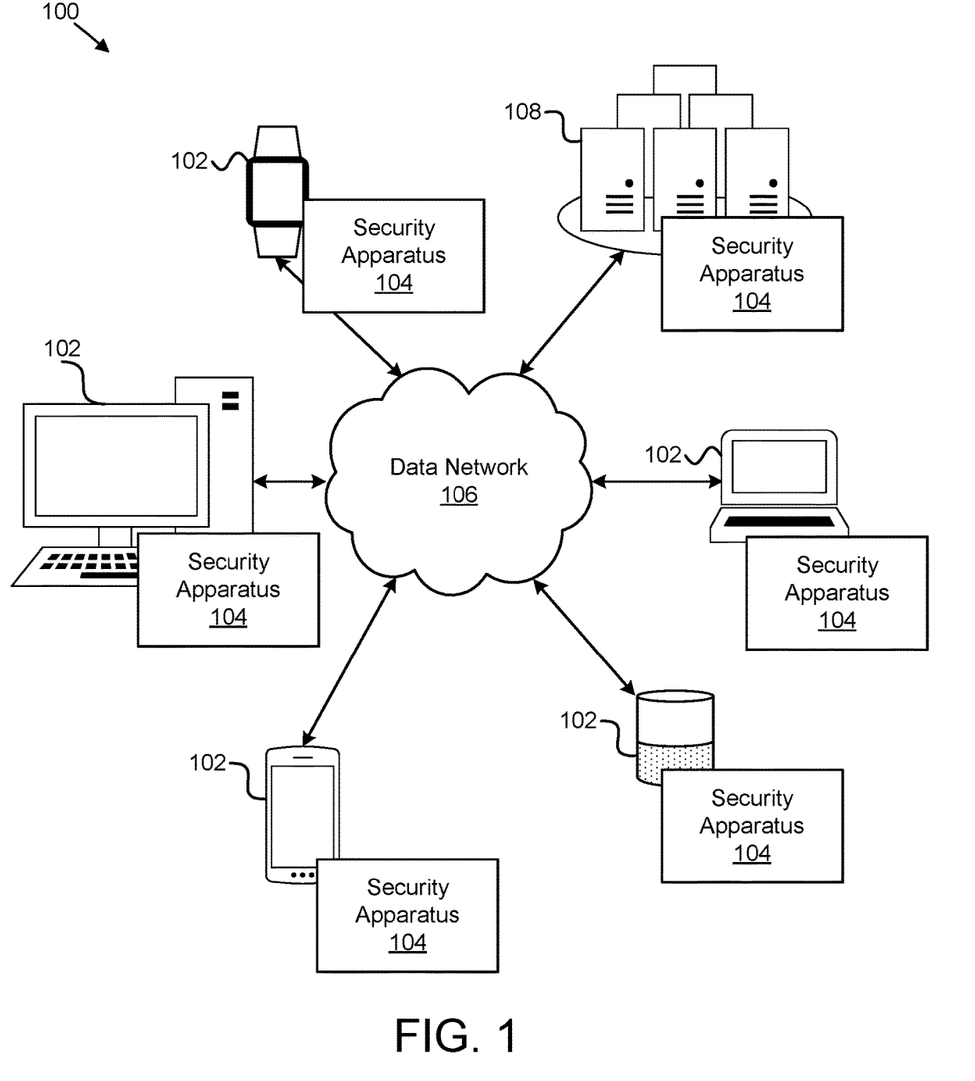
FIG. 1 is schematic block diagram illustrating one embodiment of a system for detecting man in the middle attacks on a local area network.

FIG. 1 depicts one embodiment of a system 100 for detecting man in the middle attacks on a local area network. In one embodiment, the system 100 includes one or more information handling devices 102, one or more security apparatuses 104, one or more data networks 106, and one or more servers 108. In certain embodiments, even though a specific number of information handling devices 102, security apparatuses 104, data networks 106, and servers 108 are depicted in FIG. 1, one of skill in the art will recognize, in light of this disclosure, that any number of information handling devices 102, security apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, e.g., a local area network, described below. The information handling devices 102, in a further embodiment, may include processors, processor cores, and/or the like that are configured to execute various programs, program code, applications, instructions, functions, and/or the like.

In one embodiment, the security apparatus 104 is configured to detect man-in-the-middle ("MitM") attacks on a local area network ("LAN"). As used herein, a MitM attack is an attack where the attacker secretly relays and possibly alters the communication between two parties/devices who believe they are directly communicating with each other. One example of a MitM attack is active eavesdropping, in which the attacker makes independent connections with the victims and relays messages between them to make them believe they are talking directly to each other over a private connection, when in fact the entire conversation is controlled by the attacker.

In one embodiment, the security apparatus 104 is configured to detect MitM attacks on a LAN by checking network settings information associated with a router, gateway, or other similar network device that is located behind a firewall on the LAN and is configured to transmit data packets between devices connected to the network (e.g., within the LAN and on the Internet). The network settings information, for instance may include media access control ("MAC") addresses or internet protocol ("IP") addresses. The security apparatus 104 may request a second set of network settings information to compare against an original or first set of network settings information to determine if there are differences between the network settings information, e.g., to determine if a MAC address for the router does not match the received MAC address. If there are differences, then the security apparatus 104 can trigger an action to counter the MitM attack. The security apparatus 104, in one embodiment, improves the security of a LAN by reliably detecting MitM attacks by monitoring information, e.g., MAC and IP address, that cannot be changed, but that the MitM attacker attempts to hide or spoof, and then taking one or more actions to counter the MitM's attack.

In various embodiments, the security apparatus 104 may be embodied as a hardware appliance that can be installed or deployed on an information handling device 102, on a server 108, a router, or elsewhere on the data network 106. In certain embodiments, the security apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the security apparatus 104 may include a power interface, a wired and/or wireless network interface, a graphical interface that attaches to a display, and/or a semiconductor integrated circuit device as described below, configured to perform the functions described herein with regard to the security apparatus 104.

The security apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the security apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security apparatus 104.

The semiconductor integrated circuit device or other hardware appliance of the security apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the security apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
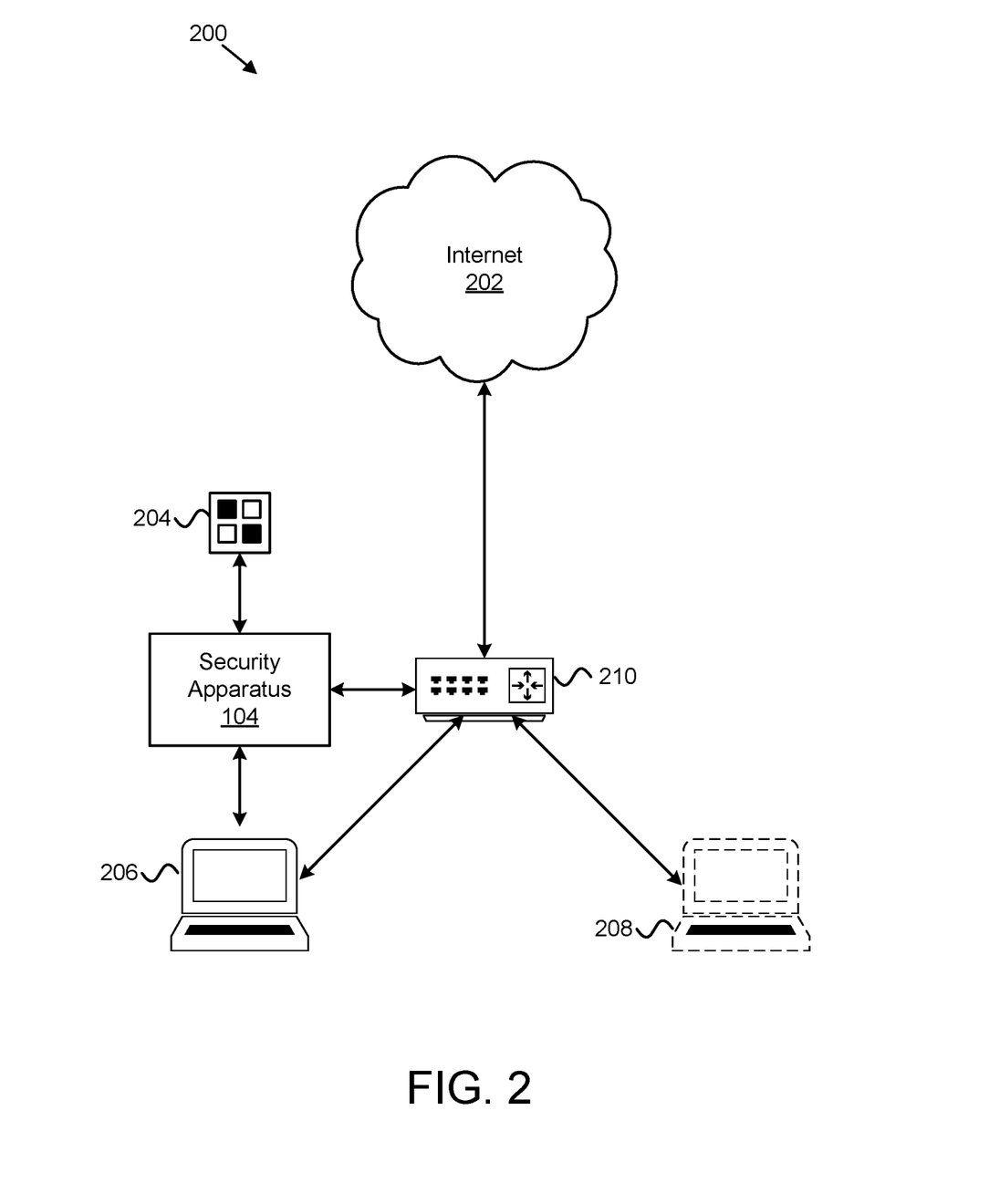
FIG. 2 is schematic block diagram illustrating one embodiment of another system for detecting man in the middle attacks on a local area network.

FIG. 2 depicts one embodiment of a system 200 for detecting man in the middle attacks on a local area network. In one embodiment, the system 200 includes a security apparatus 104, an Internet 202, a security device 204, a victim device 206, an attacker device 208, and a network router 210.

In one embodiment, a MitM attack includes an attacker device 208 that is configured to intercept communications between the victim device 206 and the network router 210. The communications may include emails, websites, financial information, or other sensitive information that the attacker device 208 can misappropriate. The attacker device 208, for instance, may use address resolution protocol ("ARP") spoofing techniques to send messages on the LAN by associating the attacker device's 208 MAC address with the IP address of another host, such as the victim device 206 and the network router 210. In this manner, when the victim device 206 sends a data packet to the network router 210, and vice versa, the attacker device 208 can intercept the data packet because the destination of the data packet will have the MAC address of the attacker device 208. The attacker device 208 may then read, alter, forward, or drop the data packet.

The security apparatus 104 counters the attacker device's 208 attacks by comparing network settings information for the network router 210 that are previously logged or stored, e.g., when the network router 210 is first setup on the LAN with network settings information received from the network router 210 at a subsequent time. If there is a MitM attack, the subsequently received network settings information will not match the previously recorded network settings information, e.g., the originally recorded MAC address for the router will not match the MAC address for the attacker device, and therefore a MitM attack can be detected.

In certain embodiments, at least portions of the security apparatus 104 are located on the network router 210, the victim device 206, and/or a separate network device 204, such as a network device that is specially programmed, hardwired, and/or the like to monitor network settings information and detect MitM attacks within the LAN.

Figure 3:
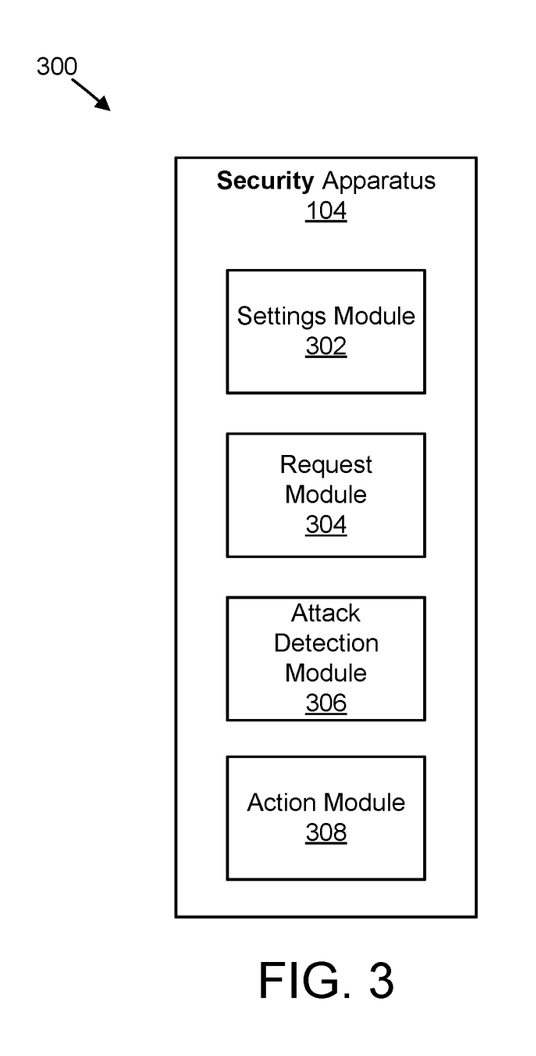
FIG. 3 is schematic block diagram illustrating one embodiment of an apparatus for detecting man in the middle attacks on a local area network.

FIG. 3 depicts one embodiment of an apparatus 300 for detecting man in the middle attacks on a local area network. In one embodiment, the apparatus 300 includes an instance of a security apparatus 104. The security apparatus 104, in one embodiment, includes a settings module 302, a request module 304, an attack detection module 306, and an action module 308, which are described in more detail below.

The settings module 302, in one embodiment, is configured to check, receive, read, store, and/or the like a first set of network settings information associated with a network router 210. The first set of network settings information may include MAC address information, IP address information, and/or other identifying network information for the network router 210, network gateway, or other device that is configured to transmit data packets between devices within a network (e.g., within a LAN or on the Internet).

In one embodiment, the settings module 302 determines the first set of network settings for the network router 210 when the network router 210 is first connected to the network. In some embodiments, the network router 210 broadcasts it's network settings information to devices that are connected to it. In certain embodiments, an administrator or other user stores the network settings information for the network router 210 at a network location that is accessible to the devices that are connected to the network through the network router 210. In some embodiments, the network settings information for the network router 210 is stored in a secure, encrypted manner such that unauthorized devices, e.g., a MitM attacker device 208 cannot access the network settings information for the network router 210. In this manner, the real network settings information for the network router 210 can be accessed and checked without fear that the attacker device 208 has compromised the information.

The request module 304, in one embodiment, is configured to request a second set of network settings information. The second set of network settings information may comprise network settings information that corresponds to the first set of network settings information. For instance, the request module 304 may send a ping requestor command to the network router 210 to determine the network router's 210 network settings information, e.g., the MAC address, the IP address, and/or the like. In certain embodiments, however, if there is a MitM attacker on the LAN, the received MAC and/or IP address will not match the real MAC address and/or the IP address of the network router 210 (because it will be the MAC and/or IP address of the attacker device 208) that the settings module 302 checks.

In some embodiments, the request module 304 sends a request for the second set of network settings information by sending a spoof request to the network router 210 to connect to the network. For instance, the request module 304 may send a spoof request that comprises a spoof dynamic configuration host protocol ("DHCP") request sent from a dummy, randomly generated, or otherwise unused media access control ("MAC") address. When the spoof DHCP request is received at the network router 210, the network router 210 may return a data packet that includes its IP address, domain name server ("DNS") information, MAC address information, and so on that the device, in theory, could use to connect to the LAN. If there is a MitM attack, however, at least a portion of the received network settings information will not match the real network settings information such as the MAC address, which may be the MAC address of the attacker device 208 when the request module 304 receives the response to the spoof DHCP request.

In some embodiments, the DHCP server may be on a different device than the network router 210. In such an embodiment, the network settings information that the request module 304 receives may include the MAC address and/or IP address of the DHCP server as well. In such an embodiment, detection of mismatches between the first set of network settings information and the second set of network settings information on the IP address of the network router 210, the DNS entry, the MAC address of the DHCP server, and/or the MAC address of the network router 210 may indicate a MitM attack.

In various embodiments, the request module 304 sends a request for the second set of network settings information by sending a traceroute command to the network router 210. The traceroute command, as used herein, is a computer network diagnostic tool for displaying the route or path and measuring transit delays of packets across an Internet Protocol (IP) network. In one embodiment, the second set of network settings information comprises a number of hops or devices between the request module 304 and the network router 210.

For instance, if a victim device 206 is connected directly to the network router 210, then the number of hops will be one. If there are two switches between the victim device 206 and the network router 210, then the number of hops will be three. In one embodiment, the first set of network settings information comprises the actual number of hops between a victim device 206 and the network router 210. At a subsequent time, the request module 304 may run the traceroute command to determine the number of hops between the victim device 206 and the network router 210 to determine if there are now more hops, which would indicate new, additional devices between the victim device 206 and the network router 210 one of which may be a MitM attacker device 208.

In one embodiment, the request module 304 sends a request for the second set of network settings information by sending a first dummy data packet to a MAC address for a separate device 204 connected to the network, sending a second dummy data packet to an IP address for the device 204, which is associated with the MAC address, and receiving confirmation that the first and second dummy data packets were received at the device 204 and/or confirmation that the MAC addresses of the first and second dummy data packets do not match.

For example, the request module 304 may send a data packet from the victim device 206 to a different device 204 on the network using only a MAC address of a MAC address/IP address pair for the different device 204. The request module 304 may then send a data packet to from the victim device 206 to the different device 204 using the IP address of the MAC address/IP address pair, which will require translating the IP address to the mapped MAC address to be routed through the LAN. If there is not a MitM attacker device 208 on the network, then both data packets should arrive at the device 204 even though one was sent using the MAC address directly, and the other was sent using the IP address that is mapped to the MAC address. However, even if both data packets arrive at the device 204, the comparison of the source MAC addresses may indicate a MitM attack if the source MAC addresses do not match.

In one embodiment, the request module 304 sends the request for the second set of network settings information at periodic intervals. For instance, the request module 304 may send the request for the second set of network settings information every ten minutes, half hour, hour, daily, weekly, and/or the like. In certain embodiments, an interval is selected such that bandwidth on the LAN is not slowed down or effected by the network traffic generated by the requests.

The attack detection module 306, in one embodiment, is configured to detect a MitM attacker on the LAN based on a comparison of the previously collected, logged, stored, checked, gathered, or the like network settings information for the network router 210 and the subsequent network settings information that the request module 306 receives. For instance, as described above, if the previously stored MAC address for the network router 210 does not match the source MAC address of a subsequently received data packet, e.g., in response to a DHCP request, then the attack detection module 306 may set a flag, send an alert/notification/message, and/or the like, to indicate that a discrepancy was detected and a MitM attacker 208 may be present on the LAN.

In one embodiment, the action module 308 is configured to trigger a countermeasure action related to the MitM attacker 208 in response to the attack detection module 306 detecting the presence of the MitM attacker 208. In one embodiment, the action module 308 takes a countermeasure action by logging information associated with the MitM attacker 208. For instance, the action module 308 may log or store the MAC address, the IP address, a device identifier, a port number, a serial number, and/or the like of the MitM attacker 208. In one embodiment, the logged information is backed-up to a cloud-based data store that is accessible using a web service. In such an embodiment, the logged information may be analyzed to determine trends, forecasts, and/or the like of associated with MitM attacks, occurrences of MitM attacks, the likelihood of MitM attacks, and/or the like.

In certain embodiments, the action module 308 takes a countermeasure action by broadcasting the logged information to other devices on the LAN and updating a blacklist of MitM devices based on the broadcasted logged information. For instance, each device may maintain a blacklist of MAC addresses, IP addresses, device identifiers, and/or the like that have been identified as MitM attackers 208. The action module 308 may update the information on the blacklist based on new MitM attackers 208 being identified.

In one embodiment, the action module 308 takes a countermeasure action by sending a notification to an administrator, or other user, a service, an application, and/or the like that indicates the presence of the MitM attacker 208. For example, the action module 308 may send an email, text message, instant message, alert, signal, and/or the like that includes information identifying the MitM attacker 208 such as the MitM attacker's 208 MAC address, IP address, device identifier, port number, serial number, and/or the like.

In some embodiments, the action module 308 takes a countermeasure action by poisoning or changing the address resolution protocol ("ARP") cache of the MitM attacker 208. For instance, the action module 308 may send or spoof ARP messages to the attacker device 208 so that the attacker's ARP cache is populated with dummy, invalid, or otherwise non-existent MAC address/IP address pairings so that the attacker device 208 cannot send data packets to legitimate devices in the LAN.

In further embodiments, the action module 308 takes a countermeasure action by remotely shutting-down the MitM device 208. For instance, the action module 308 may send a kill command, a shutdown command, a deactivate command, a hibernate command, and/or the like to the MitM device 208 that triggers or causes the MitM device 208 to shut down, turn off, deactivate, cease sending data packets, disconnect from the network, deactivates the network card, and/or the like so that the MitM device 208 cannot send or receive data packets on the LAN.

Other countermeasure actions that the action module 308 may take include contacting the network router 210 directly using the previously stored network settings information for the network router 210 to confirm that the network router 210 is still functioning properly, available, or the like; periodically updated the ARP caches of victim devices 206 with the real MAC/IP address for the network router 210 (as determined using the previously stored network settings information); ARP spoofing the network router 210, gateway, or victim devices 206 back to the correct MAC/IP address values; taking an image of the user associated with the MitM device 208 (assuming the MitM device 208 has a connected camera device); installing tracking applications or programs on the MitM device 208 to track the MitM device 208 and its network activity; and/or the like.

Figure 4:
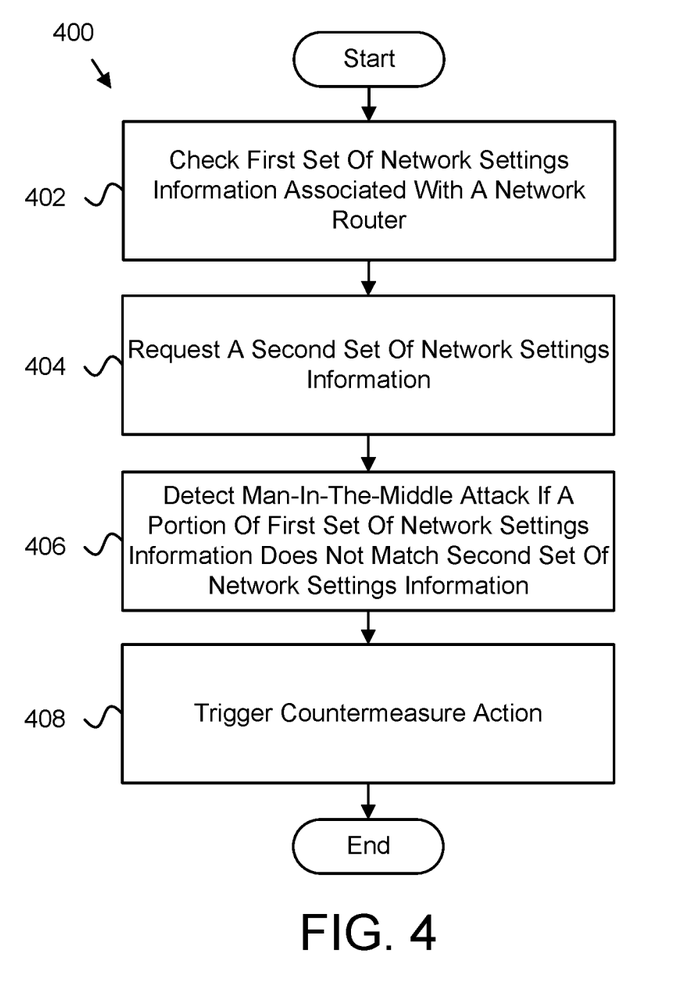
FIG. 4 is schematic flow-chart diagram illustrating one embodiment of a method for detecting man in the middle attacks on a local area network.

FIG. 4 depicts a schematic flow-chart diagram of one embodiment of a method for detecting man in the middle attacks on a local area network. In one embodiment, the method 400 begins and checks 402 a first set of network settings information associated with a network router 210. The network router 210 may be configured to transmit data packets between devices within a local area network. In further embodiments, the method 400 requests 404 a second set of network settings information that corresponds to the first set of network settings information.

In certain embodiments, the method 400 detects 406 a MitM attacker 208 on the network in response to at least a portion of the second set of network settings information not matching the first set of network settings information. In various embodiments, the method 400 triggers 408 a countermeasure action related to the MitM attacker 208, and the method 400 ends. In certain embodiments, the settings module 302, the request module 304, the attack detection module 306, and the action module 308 performs the various steps of the method 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
      check a first set of previously stored network settings information associated with a network router, the network router configured to transmit data packets between devices within a network;
      send a spoof request, to the network router, for a second set of network settings information, the spoof request comprising a spoof dynamic configuration host protocol ("DHCP") request, the second set of network settings information corresponding to the first set of network settings information;
      detect a man-in-the-middle attacker on the network by using address resolution protocol ("ARP") commands to verify that the network router sent the second set of network settings, wherein each of an internet protocol ("IP") address of the network router, a domain name system ("DNS") entry, a media access control ("MAC") address of a DHCP server, and a MAC address of the network router included in the first and second network settings information are compared to identify a mismatch between at least one of the IP address of the network router, the DNS entry, the MAC address of the DHCP server, and the MAC address of the network router for the first and second network settings information; and
      trigger a countermeasure action related to the man-in-the-middle attacker.

2. The apparatus of claim 1, wherein the request for the second set of network settings information comprises sending a traceroute command to the network router, the second set of network settings information comprising a number of hops to the network router, wherein the man-in-the-middle attacker is detected in response to the number of hops to the network router being different than a previously determined number of hops to the network router.

3. The apparatus of claim 1, wherein the request for the second set of network settings information comprises:

sending a first dummy data packet to a media access control ("MAC") address for a device connected to the network;
sending a second dummy data packet to an internet protocol ("IP") address for the device, the IP address associated with the MAC address; and
receiving one or more of confirmation that the first and second dummy data packets were received at the device and confirmation that the MAC addresses of the first and second dummy data packets do not match.

4. The apparatus of claim 1, wherein the request for the second set of network settings information is sent at periodic intervals.

5. The apparatus of claim 1, wherein the first and second sets of network settings information for the network router comprises one or more of a media access control ("MAC") address and an internet protocol ("IP") address.

6. The apparatus of claim 1, wherein the code is further executable by the processor to determine the first set of network settings when the network router is first connected to the network.

7. The apparatus of claim 1, wherein the countermeasure action comprises one or more of:
logging information associated with the man-in-the-middle attacker; and
sending a notification to an administrator that indicates the presence of the man-in-the-middle attacker.

8. The apparatus of claim 7, wherein the logged information is backed-up to a cloud-based data store that is accessible using a web service.

9. The apparatus of claim 7, wherein the countermeasure action comprises:
broadcasting the logged information to other devices on the network; and
updating a blacklist of man-in-the-middle devices based on the broadcasted logged information.

10. The apparatus of claim 1, wherein the countermeasure action comprises poisoning the address resolution protocol ("ARP") cache of the man-in-the-middle attacker.

11. The apparatus of claim 1, wherein the countermeasure action comprises remotely shutting-down the device of the man-in-the-middle attacker.

12. The apparatus of claim 1, wherein the countermeasure action comprises one or more of:
periodically refresh the ARP caches of other devices on the network with actual network settings information for the network router;
ARP spoofing other network devices with the correct network settings information;
capturing an image of a user associated with the man-in-the-middle attacker device using a camera of the man-in-the-middle attacker device; and
installing applications on the man-in-the-middle attacker device for tracking the network activity of the man-in-the-middle attacker device.

13. A method comprising:
checking a first set of previously stored network settings information associated with a network router, the network router configured to transmit data packets between devices within a network;
sending a spoof request, to the network router, for a second set of network settings information, the spoof request comprising a spoof dynamic configuration host protocol ("DHCP") request, the second set of network settings information corresponding to the first set of network settings information;
detecting a man-in-the-middle attacker on the network by using address resolution protocol ("ARP") commands to verify that the network router sent the second set of network settings, wherein each of an internet protocol ("IP") address of the network router, a domain name system ("DNS") entry, a media access control ("MAC") address of a DHCP server, and a MAC address of the network router included in the first and second network settings information are compared to identify a mismatch between at least one of the IP address of the network router, the DNS entry, the MAC address of the DHCP server, and the MAC address of the network router for the first and second network settings information; and
triggering a countermeasure action related to the man-in-the-middle attacker.

14. The method of claim 13, wherein the request for the second set of network settings information comprises sending a traceroute command to the network router, the second set of network settings information comprising a number of hops to the network router, wherein the man-in-the-middle attacker is detected in response to the number of hops to the network router being different than a previously determined number of hops to the network router.

15. The method of claim 13, wherein the countermeasure action comprises one or more of:
logging information associated with the man-in-the-middle attacker; and
sending a notification to an administrator that indicates the presence of the man-in-the-middle attacker.

16. The method of claim 15, wherein the countermeasure action comprises:
broadcasting the logged information to other devices on the network; and
updating a blacklist of man-in-the-middle devices based on the broadcasted logged information.

17. The method of claim 13, wherein the countermeasure action comprises poisoning the address resolution protocol ("ARP") cache of the man-in-the-middle attacker.

18. A computer program product comprising a computer readable storage medium storing computer usable program code executable to perform operations for:
checking a first set of previously stored network settings information associated with a network router, the network router configured to transmit data packets between devices within a network;
sending a spoof request, to the network router, for a second set of network settings information, the spoof request comprising a spoof dynamic configuration host protocol ("DHCP") request, the second set of network settings information corresponding to the first set of network settings information;
detecting a man-in-the-middle attacker on the network by using address resolution protocol ("ARP") commands to verify that the network router sent the second set of network settings, wherein each of an internet protocol ("IP") address of the network router, a domain name system ("DNS") entry, a media access control ("MAC") address of a DHCP server, and a MAC address of the network router included in the first and second network settings information are compared to identify a mismatch between at least one of the IP address of the network router, the DNS entry, the MAC address of the DHCP server, and the MAC address of the network router for the first and second network settings information based; and triggering a countermeasure action related to the man-in-the-middle attacker.

\* \* \* \* \*